(12) United States Patent
Xiong et al.

(10) Patent No.: US 11,040,420 B2
(45) Date of Patent: Jun. 22, 2021

(54) WHEEL PRESS MOUNTING DEVICE

(71) Applicant: CITIC Dicastal CO., LTD., Hebei (CN)

(72) Inventors: Guoyuan Xiong, Qinhuangdao (CN); Bowen Xue, Qinhuangdao (CN); Baojun Zhang, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 76 days.

(21) Appl. No.: 16/508,298

(22) Filed: Jul. 11, 2019

(65) Prior Publication Data

US 2020/0147735 A1   May 14, 2020

(30) Foreign Application Priority Data

Nov. 8, 2018 (CN) .......................... 201811321735.9

(51) Int. Cl.
*B23P 19/027* (2006.01)

(52) U.S. Cl.
CPC .......... *B23P 19/027* (2013.01); *B23P 2700/50* (2013.01)

(58) Field of Classification Search
CPC ..... B23P 19/027; B23P 2700/50; B23P 19/02; B23P 19/04; B23P 19/043; B23P 19/062; B23P 19/08; B23P 19/12; B23P 19/006; B60B 3/16; B60B 2310/228
See application file for complete search history.

(56) References Cited

U.S. PATENT DOCUMENTS 5,537,734 A * 7/1996 Belka ...................... B23P 19/02
                                                          29/281.4

* cited by examiner

*Primary Examiner* — Lee A Holly
(74) *Attorney, Agent, or Firm* — Syncoda LLC; Feng Ma

(57) ABSTRACT

A wheel press mounting device includes a rack, a servo motor, a synchronous belt, a working table, a base, a thrust bearing, a bearing pedestal, a shaft, a mandrel, hydraulic cylinders, a floating locating pin, strong magnets, floating shafts and a clamp platform.

1 Claim, 2 Drawing Sheets

WHEEL PRESS MOUNTING DEVICE

CROSS-REFERENCE TO RELATED APPLICATION

The present application claims benefit of Chinese Patent Application No. 201811321735.9, filed on Nov. 8, 2018, the contents of which are hereby incorporated by reference in their entirety.

BACKGROUND

With the increasing of the application range for aluminum alloy wheels, more and more customers have put forward higher requirements, and for example, pressing bolts into bolt holes of forged wheels is one of them. At present, there is no special press mounting device for accomplishing this procedure. A traditional method is that an operator puts a wheel, in which bolts are put in advance, on a clamp, and then the bolts are pressed in one by one by a press, which is cumbersome and inefficient and costs high labor intensity, so that a special press mounting device is needed to achieve complete automation of this procedure and reduce the labor intensity of the operator.

SUMMARY

The present disclosure relates to a press mounting device, and more particularly relates to an improved device for pressing a bolt into a wheel bolt hole.

The present disclosure aims to provide an improved wheel press mounting device which may simultaneously press two bolts into wheel bolt holes.

In order to achieve the aforementioned objective, the technical solution of the present disclosure is as follows: an improved wheel press mounting device, consists of a rack, a servo motor, a synchronous belt, a working table, a base, a thrust bearing, a bearing pedestal, a shaft, a mandrel, hydraulic cylinders, a floating locating pin, strong magnets, floating shafts and a clamp platform. The servo motor is fixed on the left side of the rack. The base and the bearing pedestal are both fixed on the working table. The shaft, above which the clamp platform is fixed, is fixed in the bearing pedestal through bearings. The mandrel is matched with a wheel center hole and is fixed on the clamp platform. The floating locating pin is matched with wheel bolt holes and is fixed inside the clamp platform. The floating shafts, on which the strong magnets are fixed, are mounted inside the clamp platform through limiting screws and springs. The thrust bearing is mounted inside the base, and the clamp platform and the wheel are rotated by the thrust bearing. The two hydraulic cylinders are mounted at the top end of the rack, and the axial lines of output levers are overlapped with the axial lines of the bolt holes. The servo motor drives the shaft and the wheel to rotate through the synchronous belt.

In a working process, the wheel is placed on the clamp platform, with the front face down, and is located through the mandrel and the floating locating pin; bolts pass through the wheel bolt holes and are placed above the strong magnets; and after the output levers of the two hydraulic cylinders respectively press the bolts into the wheel, the servo motor enables the wheel on the clamp platform to rotate through the synchronous belt for next bolt pressing.

The present disclosure may simultaneously press the two bolts into the wheel bolt holes during use, is very high in efficiency and avoids the problem of looseness, and has the characteristics of simple structure, low manufacturing cost, advanced process, safe and stable performance and the like.

LIST OF REFERENCE SYMBOLS

1: rack; 2: servo motor; 3: synchronous belt; 4: working table; 5: base; 6: thrust bearing; 7: bearing pedestal; 8: shaft; 9: mandrel; 10: hydraulic cylinder; 11: floating locating pin; 12: strong magnet; 13: floating shaft; and 14: clamp platform.

DETAILED DESCRIPTION

Details and working conditions of a specific device provided according to the present disclosure are described below in combination with accompanying drawings.

Figure 1:
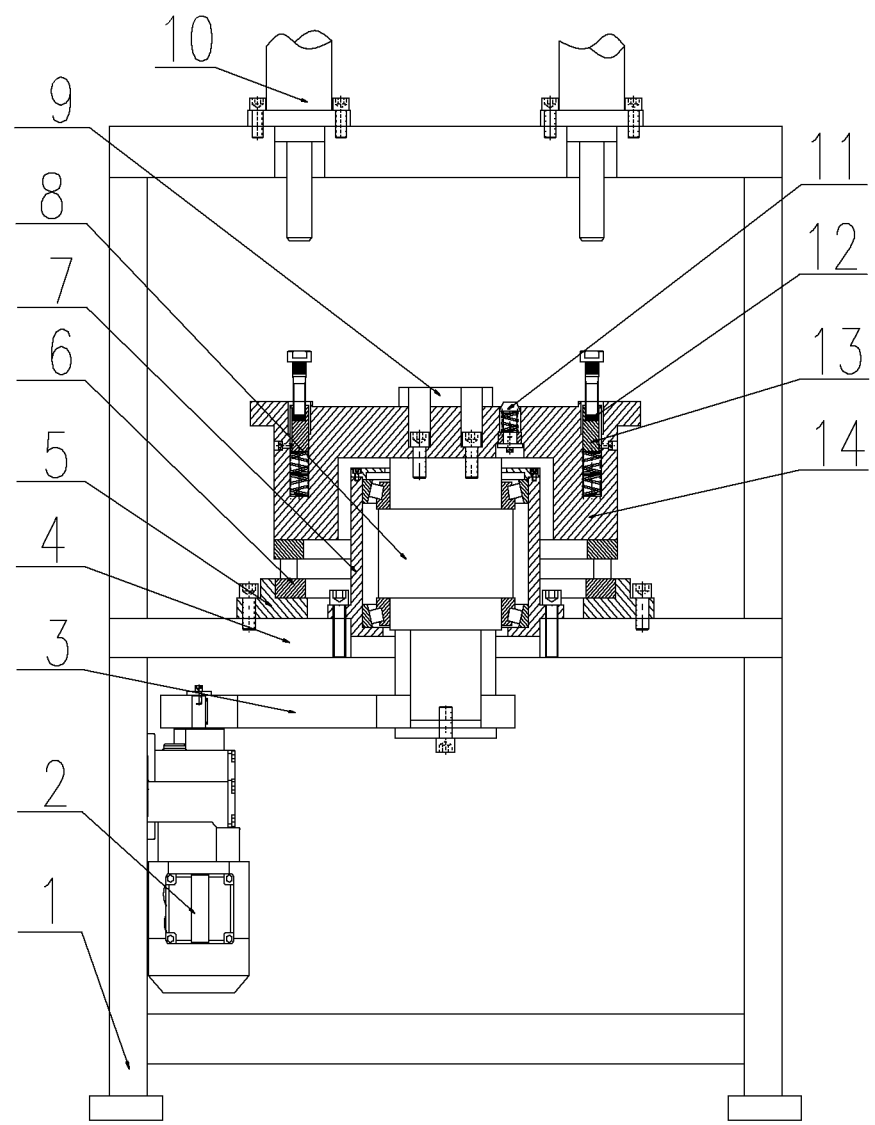
FIG. 1 is a front view of an improved wheel press mounting device of the present disclosure.
Figure 2:
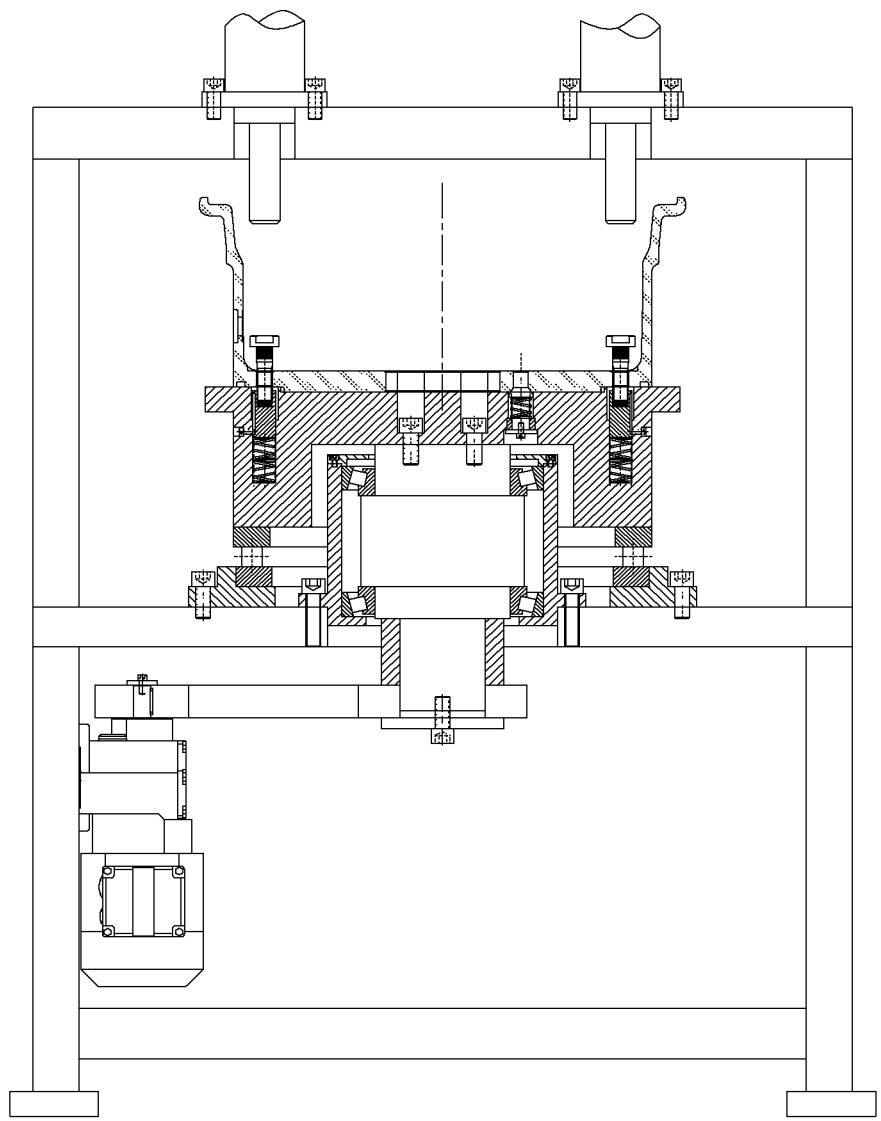
FIG. 2 is a front view of an improved wheel press mounting device of the present disclosure during working.

As illustrated in FIG. 1 and FIG. 2, the device comprises a rack 1, a servo motor 2, a synchronous belt 3, a working table 4, a base 5, a thrust bearing 6, a bearing pedestal 7, a shaft 8, a mandrel 9, hydraulic cylinders 10, a floating locating pin 11, strong magnets 12, floating shafts 13 and a clamp platform 14. The servo motor 2 is fixed on the left side of the rack 1. The base 5 and the bearing pedestal 7 are both fixed on the working table 4. The shaft 8, above which the clamp platform 14 is fixed, is fixed in the bearing pedestal 7 through bearings. The mandrel 9 is matched with a wheel center hole and is fixed on the clamp platform 14. The floating locating pin 11 is matched with wheel bolt holes and is fixed inside the clamp platform 14. The floating shafts 13, on which the strong magnets 12 are fixed, are mounted inside the clamp platform 14 through limiting screws and springs. The thrust bearing 6 is mounted inside the base 5, and the clamp platform 14 and the wheel are rotated by the thrust bearing 6. The two hydraulic cylinders 10 are mounted at the top end of the rack 1, and the axial lines of output levers are overlapped with the axial lines of the bolt holes. The servo motor 2 drives the shaft 8 and the wheel to rotate through the synchronous belt 3.

In a working process, the wheel is placed on the clamp platform 14, with the front face down, and is located through the mandrel 9 and the floating locating pin 11; bolts pass through the wheel bolt holes and are placed above the strong magnets 12; and after the output levers of the two hydraulic cylinders 10 respectively press the bolts into the wheel, the servo motor 2 enables the wheel on the clamp platform 14 to rotate through the synchronous belt 3 for next bolt pressing.

The invention claimed is:

1. A wheel press mounting device, comprising a rack, a servo motor, a synchronous belt, a working table, a base, a thrust bearing, a bearing pedestal, a shaft, a mandrel, hydraulic cylinders, a floating locating pin, magnets, floating shafts and a clamp platform, wherein the servo motor is fixed on the left side of the rack; the base and the bearing pedestal are both fixed on the working table; the shaft, above which the clamp platform is fixed, is fixed in the bearing pedestal through bearings; the mandrel is matched with a wheel center hole and is fixed on the clamp platform; the floating locating pin is matched with wheel bolt holes and is fixed inside the clamp platform; the floating shafts, on which the magnets are fixed, are mounted inside the clamp platform through limiting screws and springs; the thrust bearing is mounted inside the base, and the clamp platform and the wheel are rotated by the thrust bearing; the two hydraulic cylinders are mounted at the top end of the rack, and the axial lines of output levers are overlapped with the axial lines of the bolt holes; the servo motor drives the shaft and the wheel to rotate through the synchronous belt.

\* \* \* \* \*